United States Patent [19]

Greenlee

[11] Patent Number: 4,463,069

[45] Date of Patent: Jul. 31, 1984

[54] BATTERY VENTING SYSTEM

[75] Inventor: Michael E. Greenlee, Muncie, Ind.

[73] Assignee: General Motors Corporation, Detroit, Mich.

[21] Appl. No.: 478,285

[22] Filed: Mar. 24, 1983

[51] Int. Cl.³ .............................................. H01M 2/12
[52] U.S. Cl. ........................................ 429/86; 429/88
[58] Field of Search .................................... 429/86–89, 429/82, 72

[56] References Cited

U.S. PATENT DOCUMENTS

| | | | |
|---|---|---|---|
| 3,879,227 | 4/1975 | Hennen | 429/88 X |
| 3,915,752 | 10/1975 | Gross | 429/86 |
| 4,002,495 | 1/1977 | Hakarine | 429/87 |
| 4,072,799 | 2/1978 | Leeson et al. | 429/82 |
| 4,219,612 | 8/1980 | Tatlock | 429/86 |
| 4,294,896 | 10/1981 | Ueda | 429/86 |
| 4,400,450 | 8/1983 | Wagner | 429/86 |

Primary Examiner—Anthony Skapars
Attorney, Agent, or Firm—Lawrence B. Plant

[57] ABSTRACT

An electric storage battery having a battery gas venting system including: an electrolyte-trapping chamber; an exhaust port for venting battery gases to the ambient; a porous flame arresting filter between the electrolyte-trapping chamber and the port; a combustion chamber adjacent the exhaust port for the controlled combustion of the battery gases; a buffer chamber intermediate the porous filter and the combustion chamber; a partition separating the combustion and buffer chambers; and a relatively small aperture communicating the combustion and buffer chambers one with the other. The aperture between the buffer and combustion chambers preferably has an effective cross-sectional area which is no more than about one-half the cross-sectional area of the exhaust port.

3 Claims, 5 Drawing Figures

BATTERY VENTING SYSTEM

This invention relates to venting systems for electric storage batteries and more particularly to venting systems which include a microporous filter which permits the egress of gases from the battery cell(s) while preventing the ingress of flame thereto.

Battery manufacturers typically provide SLI batteries (e.g., Pb-acid) with a venting system which: traps electrolyte and refluxes it back to the battery innards while still permitting egress of any internally generated gases to the ambient. Such venting systems are typically equipped with a microporous filter (e.g., sintered polypropylene, SiC, etc.) which is located proximate the venting system's exhaust port and so arranged that all of the gases pass through the filter. Such filters have proved to be highly effective means for intercepting and quashing transient flames resulting from external ignition of the gases and thereby prevent propagation of such flame(s) back into the cells. Such filters have also proved to be temporarily effective against sustained flame(s), but can eventually be damaged if direct exposure thereto is prolonged.

At least one manufacturer has suggested that prolonged exposure of the filter to a flame can be eliminated by locating the filter inwardly of the exhaust port and providing a combustion chamber interjacent the filter and the exhaust port. The combustion chamber lies contiguous the filter and provides for a controlled combustion of the gases in the chamber which is such as to extinguish or "blow out" any ignited gases that would otherwise continuously stream from the exhaust port. Such designs, however, expose the filter directly to the heat and force generated by the expanding gases ignited in the combustion chamber which itself may dislodge the filter from position or otherwise deleteriously effect the filter and shorten its useful life.

It is the principal object of the present invention to provide a battery venting system with: a porous filter for permitting gas egress from the battery while preventing flame ingress into the battery; a battery gas combustion chamber to disrupt flames occurring at the exhaust port; a buffering means between the filter and the chamber to insulate the filter from the heat and percussive forces generated in the combustion chamber by ignition of the gases therein; and means to direct the flow of expanding gases such as to extinguish any flames at the battery's exhaust port; whereby the effectiveness of the filter is prolonged even at high levels of overcharge (e.g., 40 amps). This and other objects and advantages of the present invention will become more readily apparent from the detailed description thereof which follows.

BRIEF DESCRIPTION OF THE INVENTION

This invention comprehends a battery gas venting system which includes: an electrolyte-trapping chamber in gas-flow communication with a cell(s) of a battery; a porous flame-arresting filter through which the battery gases pass before exiting the battery and which serves to extinguish any flame attempting to pass back (i.e, counter to the outflow of gas) therethrough; an exhaust port for venting the gases to the ambient; a combustion chamber adjacent the exhaust port for the controlled combustion of battery gases; a buffer chamber intermediate the porous filter and the combustion chamber for mitigating the impact of foces generated in the combustion chamber on the filter; a partition separating the combustion and buffer chambers; and an aperture communicating the combustion and buffer chambers one with the other, wherein the cross-sectional area of the aperture is sufficiently less than the cross-sectional area of the exhaust port that the expanding gases resulting from the controlled combustion are preferentially directed outwardly through the gas port to "blow out" or extinguish any flame thereat and thereby to prevent the establishment of a sustained flame at the exhaust port. Preferably the ratio of the cross-sectional area of the exhaust port to the effective cross-sectional area of the inter-chamber aperture will be at least about 2:1 and most preferably about 2.5:1 or more. In a particularly preferred embodiment, the venting system is a manifold for venting a plurality of cells through a common exhaust port(s).

DETAILED DESCRIPTION OF A PREFERRED EMBODIMENT OF THE INVENTION

The invention herein may best be illustrated by reference to a preferred embodiment thereof which is described hereafter in conjunction with the following drawings in which.

Figure 1:
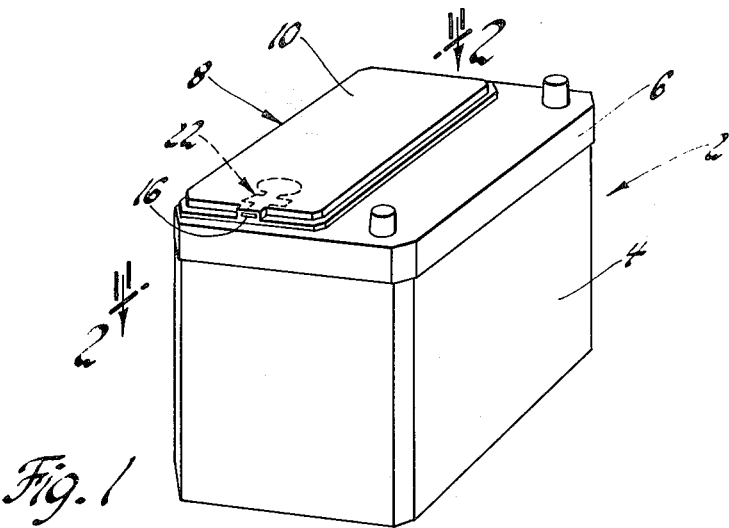
FIG. 1 is an isometric view of a Pb-acid, SLI battery having a 6-cell venting manifold in accordance with the present invention.
Figure 2:
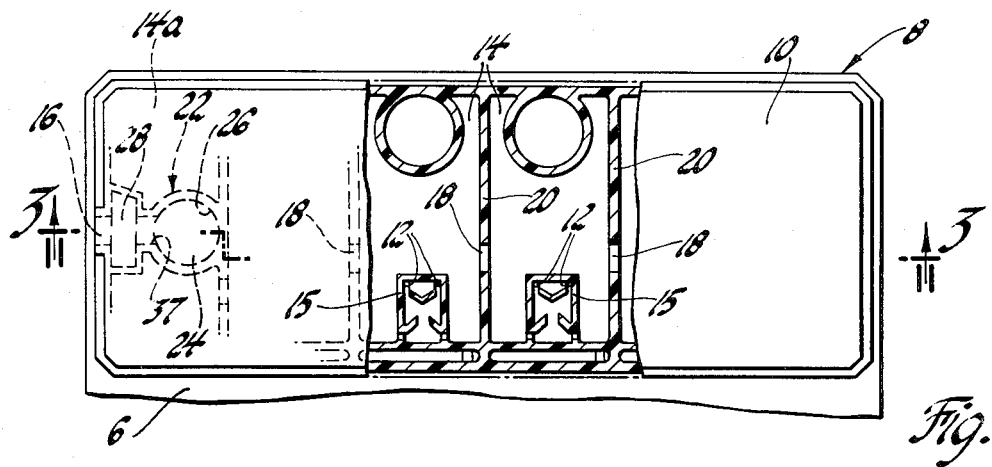
FIG. 2 is a partially broken-away plan view in the direction 2—2 of FIG. 1.

FIG. 1 depicts a storage battery 2 having a case 4 which, in the case of an automotive SLI battery, houses six discrete Pb-acid cells 17. The several cells include a stack of leady positive and negative plates immersed in a sulfuric acid electrolyte. A cover 6 is sealed to the case 4 so as to contain the electrolyte and isolate one cell from the other. During periods of excessive overcharge, the water in the electrolyte is decomposed into its constituent gases. These gases must be vented to the ambient to prevent pressure buildup and eventual bulging of the case 4.

Venting of the battery gases is effected by means of venting system 8 housed between the top of the cover 6 and a mating lid 10, as is well known in the art. Such venting systems 8 typically include gas vent and electrolyte reflux openings 12 at the low point of an electrolyte-trapping chamber 14 which also includes an appropriate baffle means 15 for providing a tortuous electrolyte travel path through the trapping chamber 14. The precise arrangement of the electrolyte-trapping chamber 14 illustrated is not a part of the present invention and accordingly shall not be dwelt upon herein. Rather the particular trapping chamber arrangement shown is the subject of copending U.S. patent application Ser. No. 437,312 filed Oct. 28, 1982, in the name of David T. Poe and assigned to the assignee of the present invention which copending application is herein incorporated by reference to the extent it may be useful. Suffice it to say that each battery cell 17 has a corresponding electrolyte-trapping chamber 14 in the venting sytem and the several trapping chambers 14 are intercommunicated one with the other via notches 18 in the septums 20 to form a manifold for conducting all of the battery gases to the ambient via a single exhaust port 16. The exhaust port 16 is backed by the sustained-flame-disrupting structure of the present inventor. This sustained-flame-disrupting structure is generally indicated at 22 and will be discussed in more detail hereinafter.

Figure 3:
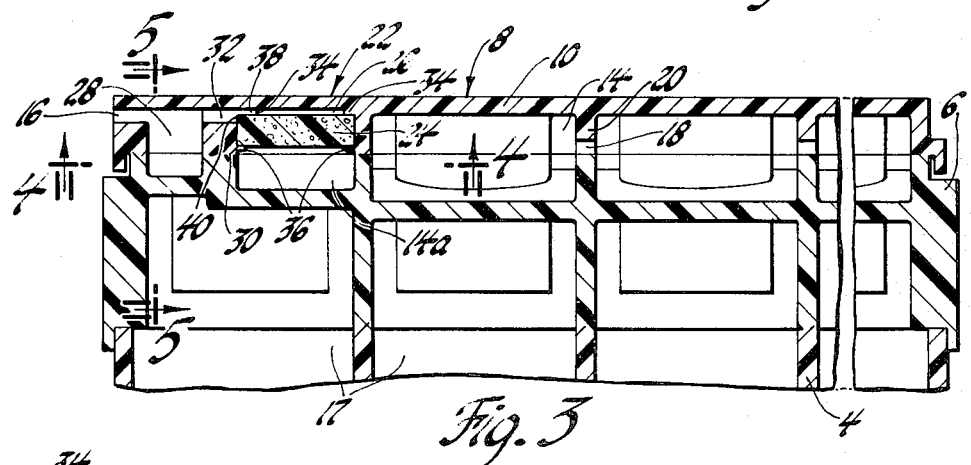
FIG. 3 is an enlarged side sectioned view taken in the direction 3—3 of FIG. 2.
Figure 4:
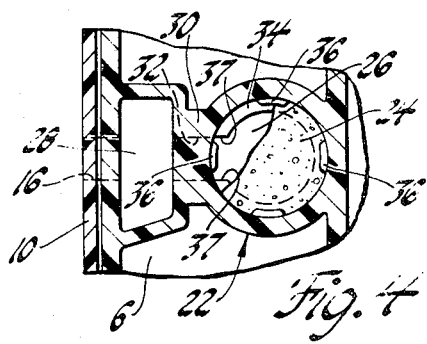
FIG. 4 is a bottom view taken in the direction 4—4 of FIG. 3.
Figure 5:
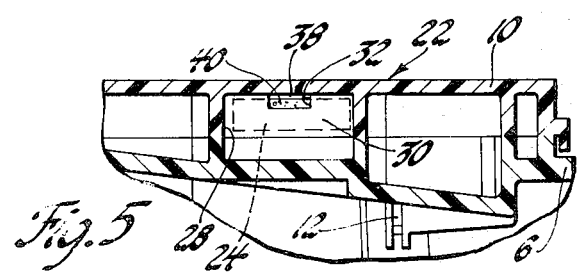
FIG. 5 is a front sectional view taken in the direction 5—5 of FIG. 3.

To exit the battery, the gases from the several electrolyte-trapping chambers 14 enter the end such chamber 14a, pass upwardly through a conventional microporous flame arresting filter 24 and ultimately to the ambient via exhaust port 16. Means 22, according to the present invention, are provided between the filter 24 and the exhaust port 16 to prevent the establishment of a sustained flame at the mouth of the exhaust port 16 without subjecting the porous filter to potentially destructive forces. This sustained-flame-disrupting means 22 comprises a buffer chamber 26 adjacent the filter 24, a combustion chamber 28 adjacent the exhaust port 16 and a partition 30 separating the two chambers 26 and 28. An aperture 32 through the partition 30 interconnects the buffer chamber 26 with the combustion chamber 28 such that gases entering the buffer chamber 26 from filter 24 pass through combustion chamber 28 before exiting the battery via exhaust port 16. In this particular embodiment of the invention the buffer chamber 26 is quite narrow and lies between the upper face 23 of the filter 24 and the underside of lid 10. A discontinuous annular shoulder 34 is molded on the underside of the lid 10 and keeps the filter 24 appropriately spaced from the underside of the lid 10 during assembly. After positioning against the shoulder 34, the filter 24 is held in place as by heat staked retention tabs 36 on the underside thereof (see FIGS. 3 and 4).

The combustion chamber 28 is positioned between the buffer chamber 26 and the port 16 and serves to provide a region in the venting system where controlled combustion can occur. The limited availability of oxygen in the combustion chamber 28 prevents continuous burning therein as well as back into the buffer chamber 26.

In the particular embodiment depicted and for molding convenience, the actual cross-sectional area of the aperture 32 between the buffer 26 and combustion 28 chamber is approximately the same as the cross-sectional area of the exhaust port 16. In this instance, however, the effective cross-sectional area of the aperture 32 (i.e., for gas flow purposes) is substantially less than its actual cross-sectional area since the corner 40 of the filter 24 blocks much of the aperture's opening. Hence, in this instance, the effective cross-sectional area of the aperture 32 is the size of the orifice 38 defined by the upper surface of the corner 40, the underside of the lid 10 and the end walls 37 of the discontinuous shoulder 34. It is the size of the orifice 38 then that determines the flow between the buffer and the combustion chambers and as shown here is less than half the size (i.e., cross-sectional area) of the port 16. Regardless how formed, this aperture or orifice, as the case may be, is sufficiently less than the cross-sectional area of the exhaust port 16 as to insure that the expanding ignited gases in combustion chamber 28 preferentially stream out of the exhaust port 16 so as to "blow out" or otherwise thwart the establishment of a sustained flame thereat. Meanwhile the gases in the buffer chamber 26 apparently acts like a cushion to mitigate the percussive impact of the ignited gases on the filter 24 as well as to insulate the filter 24 from the heat generated in the combustion chamber 28.

To illustrate the effectiveness of the present invention standard commercial, lead-acid storage batteries manufactured by Applicant's assignee were equipped with sustained-flame-disrupting means 22 such as shown in the several Figures wherein the buffer chamber 26 had a volume of about 0.15 cc, a combustion chamber 28 having a volume of about 0.74 cc, an exhaust port having a cross-sectional area of 11.4 mm$^2$ and an interchamber aperture having an effective cross-sectional area (i.e., orifice 38) of 4.56 mm$^2$. The batteries were subjected to the Battery Council International's Recommended Test Procedure For Battery Safety Vents (i.e., 12-Volt). In this regard, the batteries were overcharged at the rate of 40 ampere and a continuous spark maintained at the exhaust port 16. This test was characterized only by a rapid succession of audible "pops" at the port 16. At no time during the course of the test did a flame persist at the port 16.

While this invention has been described primarily in terms of a specific embodiment thereof it is not intended to be limited thereto but rather only to the extent set forth hereafter in the claims which follow.

The embodiments of the invention in which an exclusive property or privilege is claimed are defined as follows:

1. In a venting system for an electric storage battery including an exhaust port for venting battery gases to the ambient and means for quashing any flame invading said system through said port, said means comprising: a porous flame-arresting filter intermediate a cell of said battery and said port for permitting egress of said gases while preventing ingress of said flame; a combustion chamber adjacent said port for the controlled combustion of said gases therein; a buffer chamber intermediate said combustion chamber and said filter to mitigate the impact of said controlled combustion on said filter; a partition separating said combustion and buffer chambers one from the other; and an aperture through said partition for communicating said combustion and buffer chambers, said aperture having an effective cross-sectional area which is sufficiently less than the cross-sectional area of said port that the forces generated by said controlled combustion are relieved primarily through said port and serve to prevent establishment of a sustained flame at said port incident to the ignition of said gases thereat.

2. A venting system for relieving gases from the innards of an electric storage battery comprising: a housing defining a trapping chamber for inhibiting the traverse of electrolyte from said innards to the ambient; a vent opening in said housing communicating said trapping chamber with said innards; an exhaust port in said housing for discharging said gases from said trapping chamber to the ambient; a porous, flame-arresting filter positioned in said housing between said opening and said port for passing gases outwardly therethrough toward said port while preventing ignited gases from passing backwardly therethrough toward said innards; a combustion chamber adjacent said port for the controlled combustion of said gases therein to prevent establishment of a sustained flame of ignited gases at said port; and a buffer chamber intermediate said combustion chamber and said filter for mitigating the thermal and percussive impact on said filter resulting from said controlled combustion, said buffer chamber communicating with said combustion chamber via an aperture the effective cross-sectional area of which is sufficiently less than the cross-sectional area of said exhaust port that the expanding gases in said combustion chamber are directed primarily outwardly through said port to extinguish any external flame rather than inwardly against said filter.

3. In a venting system for an electric storage battery including (1) a housing defining a manifold communicating with a plurality of battery cells and adapted to receive and conduct gases from said cells to an exhaust port for venting said gases outwardly to the ambient, (2) porous filter means inboard said port and transverse the flow of said gases through said manifold for preventing any flame resulting from ignition of said gases from traversing backwardly through said manifold into said cells, and (3) a combustion chamber within said manifold between said filter and said port for the controlled combustion of said gases, the improvement comprising: a buffer chamber intermediate said filter and said combustion chamber for protecting said filter against thermal and percussive damage, said buffer chamber receiving said gases outflowing from said filter and directing them toward said combustion chamber; a partition separating said buffer chamber from said combustion chamber; and an aperture communicating said buffer chamber with said combustion chamber through said partition, said aperture having a cross-sectional area of no more than about one half the cross-sectional area of said port.

* * * * *